Feb. 9, 1926.
A. MARRETT
1,572,442
TRAFFIC SIGNAL FOR MOTOR VEHICLES
Filed March 10, 1925
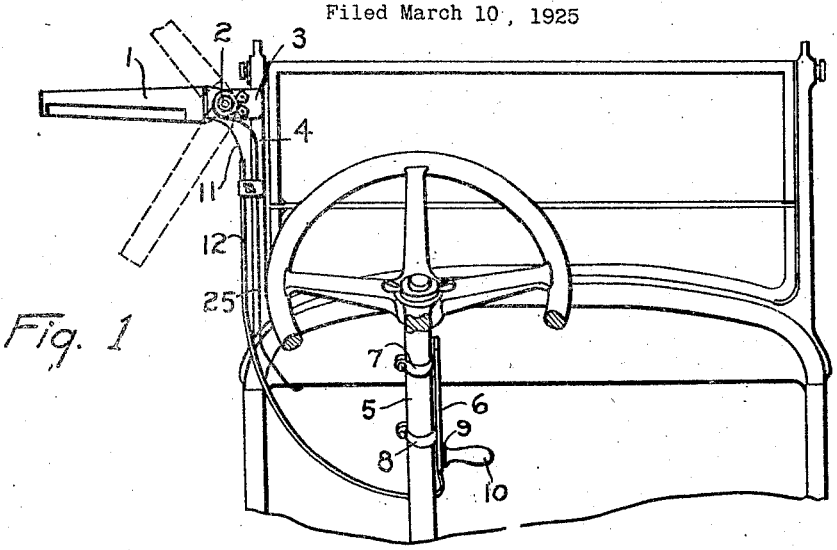
Fig. 1
Fig. 2
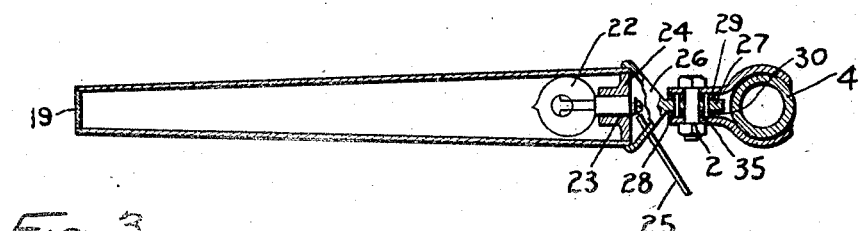
Fig. 3
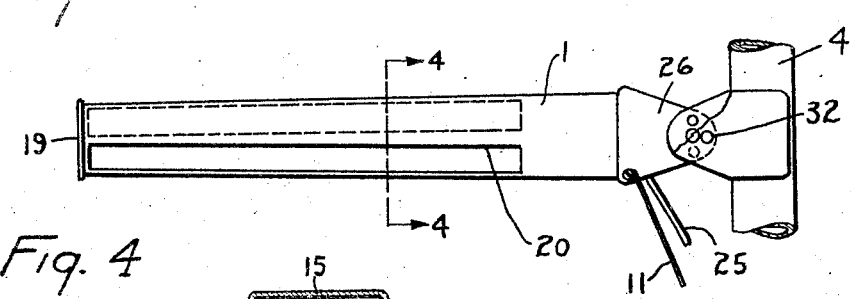
Fig. 4
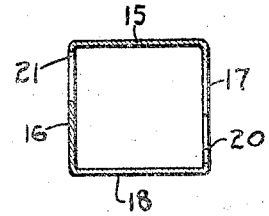
Inventor
Alexander Marrett.
by: Hazard and Miller
Attys.

Patented Feb. 9, 1926.

1,572,442

UNITED STATES PATENT OFFICE.

ALEXANDER MARRETT, OF LOS ANGELES, CALIFORNIA.

TRAFFIC SIGNAL FOR MOTOR VEHICLES.

Application filed March 10, 1925. Serial No. 14,471.

*To all whom it may concern:*

Be it known that I, ALEXANDER MARRETT, a citizen of the United States, residing at Los Angeles, in the county of Los Angeles and State of California, have invented new and useful Improvements in Traffic Signals for Motor Vehicles, of which the following is a specification.

This invention relates to traffic signals for motor vehicles.

An object of the invention is to provide in a traffic signal adapted to be mounted upon a motor vehicle and having an arm swingable to indicate the intention of the vehicle driver, a peculiar and intense type of illumination issuing from the signal arm, and automatic means for causing the illumination to occur whenever the signal arm is moved to any position but that of rest.

Other objects and advantages will be made manifest in the following specification of an embodiment of the invention illustrated in the accompanying drawings, in which:

Figure 1 is a fragmentary view of a motor vehicle having the traffic signal attached.

Figure 2 is a horizontal sectional view of the traffic signal.

Figure 3 is a horizontal side view of the traffic signal.

Figure 4 is a vertical sectional view of the traffic signal arm taken on the line 4—4 of Figure 3.

The details of construction are as follows:

A hollow signal arm 1 is pivoted at 2 to a clamp bracket 3, which in this particular instance is adapted to embrace a windshield upright 4. The clamp herein shown may be substituted by any suitable bracket adapted to be secured to the type of motor vehicle with which the traffic signal may be employed.

Carried upon the steering column 5 of the motor vehicle is a run-way 6 clamped upon the steering column by clamps 7 and 8 and having an external longitudinal slot in which a runner 9 is adapted to slide. A handle 10 is provided at the outer side of the runner, and secured to one end of the runner is a flexible shaft 11 which is adapted to slide through a housing 12, the upper end of the flexible shaft being secured to the inner end of the signal arm 1 so that the signal arm may be actuated in a vertical arc by sliding the runner 9 up or down in the run-way 6.

The particularly novel features of the invention reside in the type of signal arm employed and in the means for automatically lighting an electric light which is carried within the signal arm.

The signal arm consists of a hollow shell which may be formed of any suitable and durable material and is preferably of square cross section as indicated in Figure 4, having a top 15, side walls 16 and 17 and a bottom 18, also an end 19. A slot 20 is provided longitudinally of the signal arm 1, preferably disposed at the lower edge of the arm at the rear side, and a second longitudinal slot 21 extends near the upper edge of the signal arm at the forward side. The exterior of the shell may be painted or ornamented in any desired fashion, but it is particularly necessary that the interior of the shell should comprise a reflecting surface. It has been found that the best results are obtained by enameling the interior of the walls white and providing an electric light 22, preferably red.

The electric light is mounted in a socket 23, which is secured upon a base 24 at the inner end of the signal arm and a conduit 25 leads from the light socket to a suitable source of electrical energy.

A substantial housing 26 which may have pyramidal walls is firmly secured to the end of the signal arm as by welding and a lug 27 extends from the housing 26 and is provided with an aperture through which the pivot 2 extends. The pivot 2 is preferably a bolt and may be encased in an insulating sleeve 35, the head of which rests against one ear of the bracket 3 and the nut tightening against the other ear of the bracket 3. Insulating washers 28 and 29 are disposed between the lug 27 and the ears of the bracket, being adapted to insulate the metal of the signal arm from the metal of the bracket 3. A pair of copper lugs 30 are secured through the lug 27 and the insulating washers 28 and 29 having their ends on a substantial plane with the sides of the insulating washers. The ears of the bracket 3 are provided with apertures 32 of greater diameter than the diameter of the copper lugs 30. The electric light is grounded to the housing 26 and the source of electric energy is also grounded. The copper lugs 30 and the apertures 32 are so disposed with relation to each other that when the signal arm is depending in a substantially vertical position, or a position of rest, the ends of the copper lugs 30 will reside in the openings provided by the apertures 32 and thereby effectively break the light circuit, but when the arm is in any position other than that of rest the ends of the copper lugs 30 will frictionally bear upon the ears of the bracket 3, thus conducting a current from the housing 26 through the lug 27 to the bracket 3, which is a part of the ground.

In the operation of the traffic signal manipulation of a handle 10 as hereinbefore described will cause the signal arm swinging on the pivot 2 to be elevated to any desired signalling position, the upward movement of the signal arm then causing the electric light 22 to burn as described in the preceding paragraph.

As the globe 22 provides a colored light, preferably red, and the interior surfaces of the walls of the signal arm are white enameled, a pair of vivid and intense shafts of light are thrown both forwardly and rearwardly of the signal arm, the longitudinal extension of the slots 20 and 21 definitely indicating the position of the signal arm. This particular type of illumination is visible at great distances. When the signal arm is lowered the electric light is automatically turned out by means of the copper lugs 30 ending at the apertures 32 by which the contact is broken.

Various changes may be made without departing from the spirit of the invention as claimed.

What is claimed is:

A traffic signal for a motor vehicle having a windshield and a steering column, a bracket having a pair of ears adapted to be attached to a side frame of the windshield, a tubular signal arm having a pyramidal side wall adjacent the inner end, a lug secured to the said pyramidal wall, a pivotal connection between the lug and the bracket, the signal arm having a transverse base at its inner end, said base supporting a socket for an electric lamp, electric wires extending from the socket through the pyramidal wall, a flexible shaft connected to the tubular signal arm adjacent the pyramidal wall, and means mounted on the steering column to slide the other end of the flexible shaft to operate the signal arm.

In testimony whereof I have signed my name to this specification.

ALEXANDER MARRETT.